United States Patent
Bowers (10) Patent No.: US 10,513,300 B2
(45) Date of Patent: Dec. 24, 2019

(54) BICYCLE SEAT POST WITH ADJUSTABLE HEIGHT

(71) Applicant: Specialized Bicycle Components, Inc., Morgan Hill, CA (US)

(72) Inventor: Jeffrey K Bowers, Bellingham, WA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 59 days.

(21) Appl. No.: 15/403,920

(22) Filed: Jan. 11, 2017

(65) Prior Publication Data

US 2018/0194418 A1    Jul. 12, 2018

(51) Int. Cl.
| | |
|---|---|
| *B62J 1/08* | (2006.01) |
| *B62K 19/36* | (2006.01) |
| *B62K 3/02* | (2006.01) |
| *F16B 7/14* | (2006.01) |

(52) U.S. Cl.
CPC .................. *B62J 1/08* (2013.01); *B62K 3/02* (2013.01); *B62K 19/36* (2013.01); *F16B 7/1409* (2013.01); *B62J 2001/085* (2013.01)

(58) Field of Classification Search
CPC ......... B62J 1/08; B62J 2001/085; B62K 3/02; B62K 19/36; F16B 7/1409
USPC .......... 280/220, 281.1, 278, 287; 297/215.13
See application file for complete search history.

(56) References Cited

U.S. PATENT DOCUMENTS

| | | |
|---|---|---|
| 4,563,939 A | 1/1986 | Siegrist |
| 4,951,552 A | 8/1990 | Fox |
| 5,324,058 A | 6/1994 | Massaro |
| 5,366,275 A | 11/1994 | Sulzer |
| 5,429,217 A | 7/1995 | Stringer et al. |

(Continued)

FOREIGN PATENT DOCUMENTS

| | | | | |
|---|---|---|---|---|
| FR | 2702809 | * | 9/1994 | ................ F16C 3/03 |
| JP | 2005231567 A | | 9/2005 | |
| JP | 2005262900 A | | 9/2005 | |

OTHER PUBLICATIONS

European Patent Office Action for Application No. 17208135.8 dated May 3, 2018 (6 pages).

(Continued)

*Primary Examiner* — Anne Marie M Boehler
(74) *Attorney, Agent, or Firm* — Michael Best & Friedrich LLP (57) ABSTRACT

A bicycle seat post assembly includes a lower seat support secured to the frame, an upper seat support secured to the seat and movable relative to the lower seat support, and an adjusting mechanism coupling the lower seat support to the upper seat support. The adjusting mechanism includes a powered actuator engageable with both the lower seat support and the upper seat support and configured to move the upper seat support relative to the lower seat support, and a coupling device selectively connecting the powered actuator to one of the lower seat support or the upper seat support. The coupling device has a connected state wherein the powered actuator is operatively connected to the one of the lower seat support or the upper seat support and a disconnected state wherein the powered actuator is operatively disconnected to the one of the lower seat support or the upper seat support.

15 Claims, 11 Drawing Sheets

(56) References Cited

U.S. PATENT DOCUMENTS

| | | |
|---|---|---|
| 5,431,085 A | 7/1995 | Geffray |
| 6,050,585 A | 4/2000 | Rai |
| 6,159,119 A | 12/2000 | Nakamura et al. |
| 7,422,224 B2 | 9/2008 | Sicz et al. |
| 8,016,349 B2 | 9/2011 | Mouri et al. |
| 8,038,208 B2 | 10/2011 | Mankadi |
| 8,056,309 B2 | 11/2011 | Vandendriessche |
| 8,246,065 B1 | 8/2012 | Kodama et al. |
| 8,317,261 B2 | 11/2012 | Walsh |
| 8,550,551 B2 | 10/2013 | Shirai |
| 8,752,893 B2 | 6/2014 | Chien et al. |
| 8,814,109 B2 | 8/2014 | Laird et al. |
| 8,833,786 B2 | 9/2014 | Camp et al. |
| 8,833,848 B2 | 9/2014 | Shirai |
| 9,242,688 B2 | 1/2016 | McAndrews et al. |
| 9,272,745 B2 | 3/2016 | Camp et al. |
| 9,415,824 B2 | 8/2016 | Maier |
| 2004/0079224 A1 | 4/2004 | Bernhardt et al. |
| 2006/0175792 A1* | 8/2006 | Sicz ............... B62J 1/06 280/200 |
| 2008/0127770 A1* | 6/2008 | Morelli ............ B62J 1/08 74/551.1 |
| 2012/0006949 A1* | 1/2012 | Laird .............. B62J 1/08 248/161 |
| 2012/0180470 A1 | 7/2012 | Schroeder et al. |
| 2012/0228906 A1 | 9/2012 | McAndrews et al. |
| 2015/0034779 A1 | 2/2015 | McAndrews et al. |
| 2016/0304146 A1 | 10/2016 | Teixeira et al. |

OTHER PUBLICATIONS

CutleryLover, "Explaining How OTF Automatic Knives Work (OTF = Out the Front)," <https://www.youtube.com/watch?v=8dtJkpgn6SU&t=31s> published Jul. 31, 2016.

Mechanisms, "Reciprocate Gear," <https://www.youtube.com/watch?v=Sk8oqLw12Tw> published Apr. 24, 2018.

U.S. Appl. No. 15/787,271, filed Oct. 18, 2017, by Teixeira et al.

European Patent Office Action for Application No. 17208135.8 dated Apr. 26, 2019 (4 pages).

U.S. Appl. No. 15/097,667, filed Apr. 13, 2016, by Teixeira et al.

\* cited by examiner

BICYCLE SEAT POST WITH ADJUSTABLE HEIGHT

BACKGROUND

The present invention relates to bicycle seat posts having adjustable heights.

Most bicycles include a seat post for supporting the seat above the frame. Seat posts are commonly inserted into the seat tube of the bicycle frame and secured in place by a binder bolt. The height of the seat can be adjusted to accommodate riders of various sizes by loosening the binder bolt, sliding the seat post relative to the seat tube, and re-tightening the binder bolt. It can be appreciated that this adjustment to the seat height must be done with the bicycle in a stationary position, with the rider off the bicycle.

In certain situations, it is desirable to adjust the height of a seat while the bicycle is being ridden. For example, in certain off-road riding situations, it is beneficial to lower the seat in order to lower the center of gravity of the rider. This is often advantageous when riding the bicycle at high speeds (e.g., downhill) over bumpy terrain. After the downhill bumpy terrain, it is often desirable to raise the seat back to its original position so that the rider can comfortably sit on the seat and efficiently pedal the bicycle.

In order to satisfy the need for adjusting the seat height while riding, it is known to provide seats that can be adjusted on the fly. For example, it is known to make the seat post from two telescoping members that are coupled by a threaded rod driven by an electric motor. The position of the seat can be adjusted by actuating the motor and turning the threaded rod. Such a system is disclosed in U.S. Pat. No. 6,050,585. Alternatively, it is known to bias the telescoping tubes to an extended position by a spring (e.g., a mechanical or air spring). A locking mechanism (e.g., a hydraulic lock) can be used to selectively secure the height of the seat at the desired position.

SUMMARY

The present invention provides a bicycle comprising front and rear wheels, a frame supported by the front and rear wheels, a seat, and a seat post assembly supported by the frame and supporting the seat. The seat post assembly includes a lower seat support (e.g., a lower tube) secured to the frame, an upper seat support (e.g., an upper tube) secured to the seat and movable relative to the lower seat support, and an adjusting mechanism coupling the lower seat support to the upper seat support. The adjusting mechanism includes a powered actuator engageable with both the lower seat support and the upper seat support and configured to move the upper seat support relative to the lower seat support, and a coupling device selectively connecting the powered actuator to one of the lower seat support or the upper seat support. The coupling device has a connected state wherein the powered actuator is operatively connected to the one of the lower seat support or the upper seat support and a disconnected state wherein the powered actuator is operatively disconnected to the one of the lower seat support or the upper seat support.

In one embodiment, the powered actuator comprises a threaded rod defining a helical groove, and the coupling device comprises a ball lock coupler including a socket body having a plurality of openings through a sidewall, and a plurality of locking members each positioned in a corresponding opening of the socket body and movable relative to the socket body. The locking members are adapted to engage the threaded rod. Preferably, the openings in the socket body are arranged in a substantially helical path to follow a path of the helical groove in the threaded rod. The ball lock coupler can further comprise a sleeve positioned around the socket body and movable relative to the socket body between a first position forcing the locking members to engage the threaded rod and a second position allowing the locking members to disengage the threaded rod. In this embodiment, the upper seat support is movable relative to the lower seat support along an axis, and the first position of the sleeve is axially displaced relative to the second position in a path substantially parallel to the axis.

The seat post assembly can further comprise a spring biasing the upper seat support toward an extended position relative to the lower seat support. Preferably, the upper seat support and the lower seat support are in telescoping engagement and define a chamber in between, and the spring comprises air seals sealing the chamber and pressurized air in the chamber.

The present invention also provides a method of adjusting a height of a seat post assembly having a lower seat support secured to a bicycle frame, an upper seat support secured to a bicycle seat and movable relative to the lower seat support, and an adjusting mechanism coupling the lower seat support to the upper seat support, the adjusting mechanism including a powered actuator engageable with both the lower seat support and the upper seat support and a coupling device selectively connecting the powered actuator to one of the lower seat support or the upper seat support. The method comprises actuating the powered actuator to move the upper seat support in a first direction relative to the lower seat support, disconnecting the powered actuator from one of the lower seat support or the upper seat support, moving the upper seat support in a second direction relative to the lower seat support (with the powered actuator disconnected), the second direction being substantially opposite the first direction, and reconnecting the powered actuator with the one of the lower seat support or the upper seat support.

In one embodiment, the powered actuator comprises a threaded rod, and the step of actuating comprises rotating the threaded rod. In this embodiment, the seat post assembly can further include a ball lock coupler having a locking member, and the step of disconnecting comprises disengaging the locking member from the threaded rod. Preferably, the ball lock coupler further includes a sleeve movable between a first position forcing the locking members to engage the threaded rod and a second position allowing the locking members to disengage the threaded rod, and the step of disengaging comprises moving the sleeve from the first position to the second position. In another embodiment, the seat post assembly further includes a spring biasing the upper seat support relative to the lower seat support, and the step of moving includes allowing the second seat support to move due to the biasing force of the spring.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
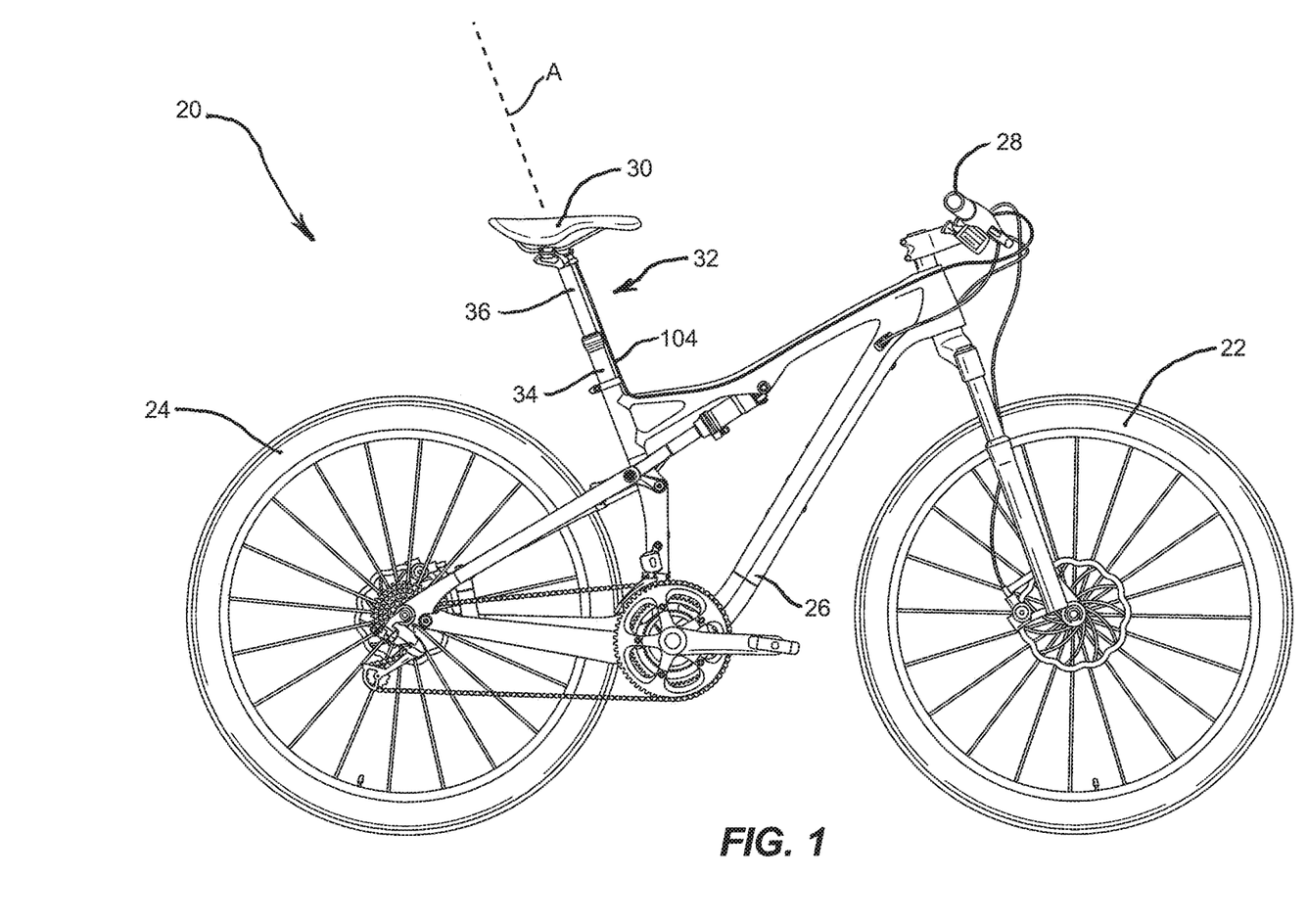
FIG. 1 is a side view of a bicycle having a seat post assembly embodying the present invention.
Figure 2:
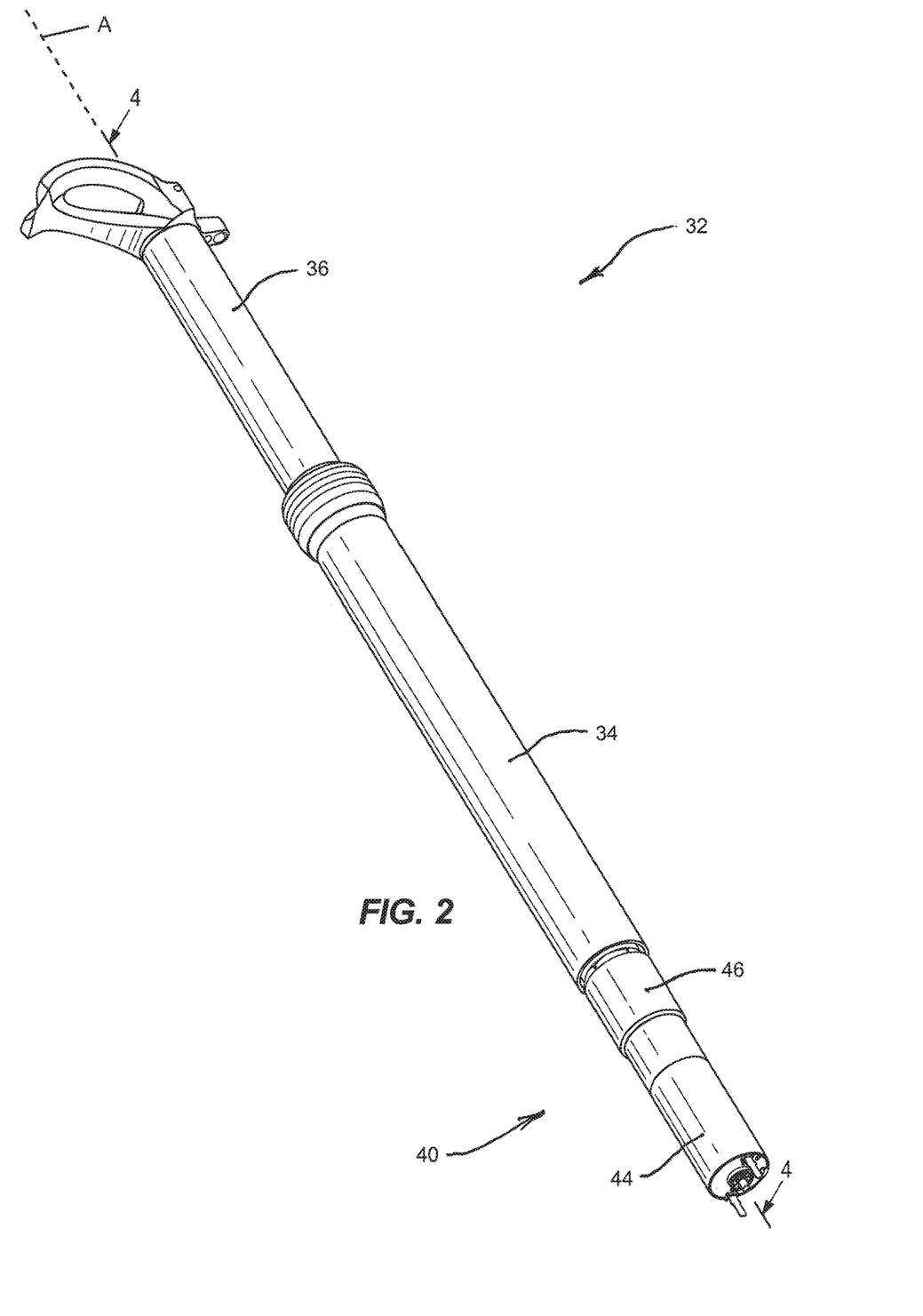
FIG. 2 is a perspective view of the seat post assembly of FIG. 1.
Figure 3:
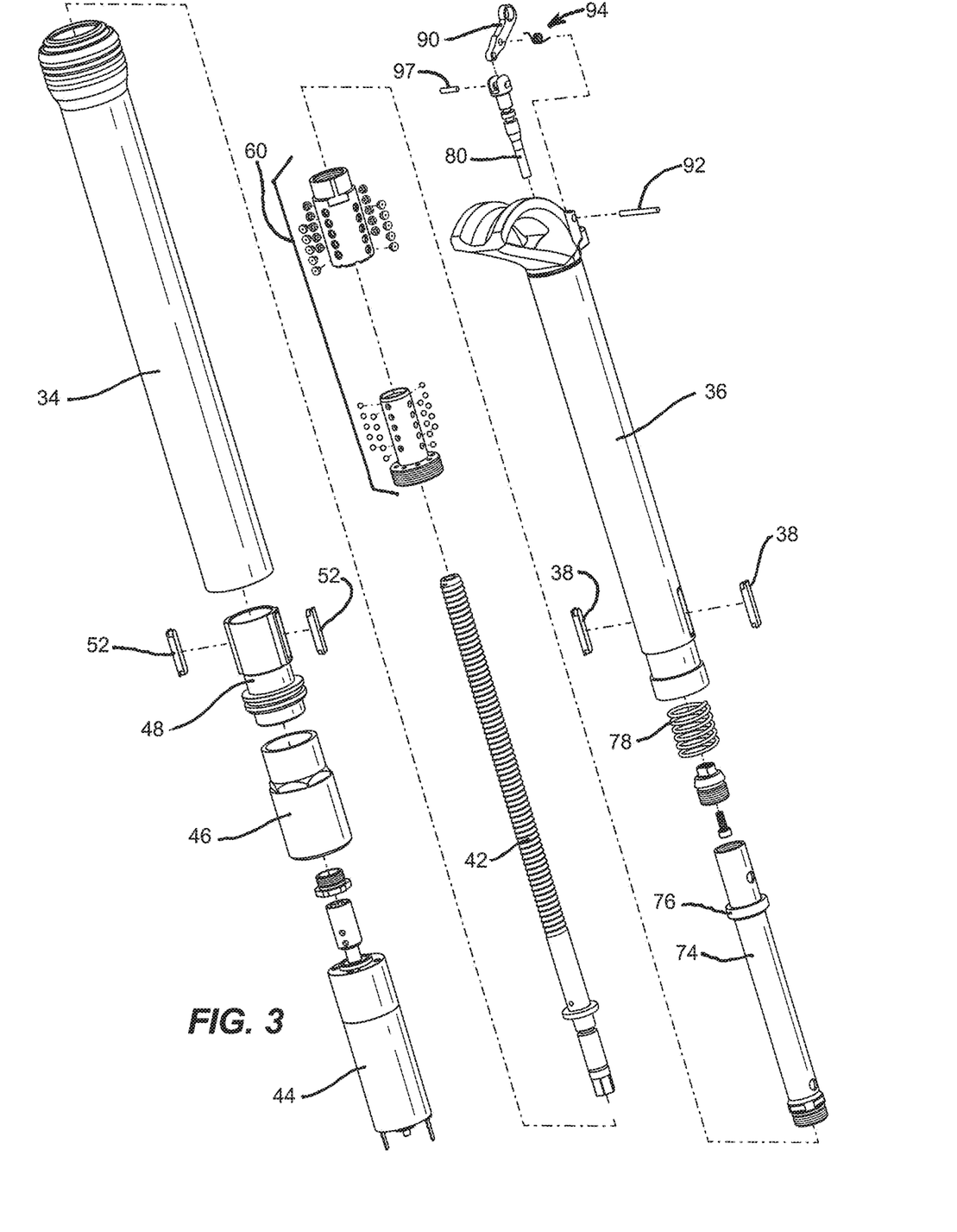
FIG. 3 is a partially exploded view of the seat post assembly of FIG. 2.
Figure 4:
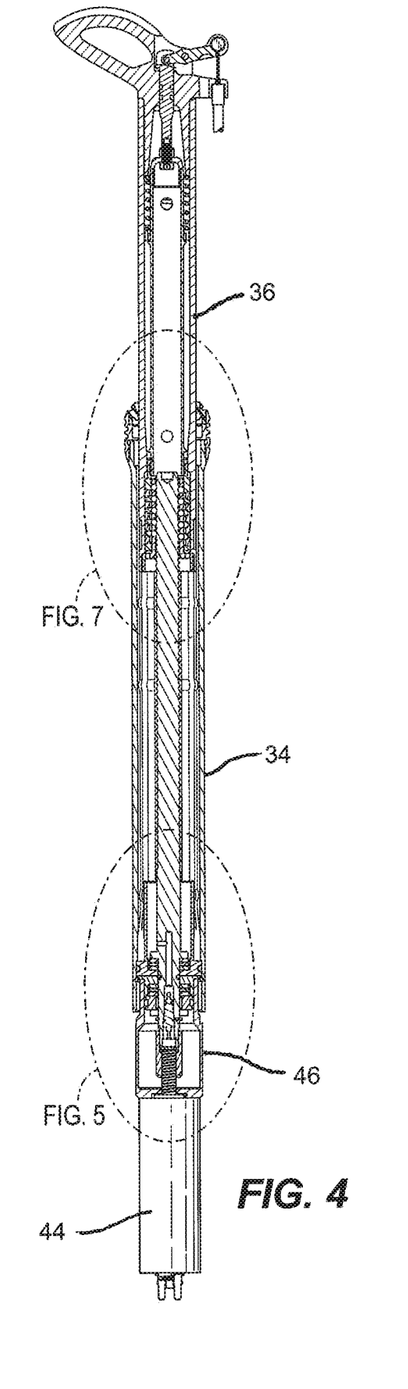
FIG. 4 is a partial section view taken along line 4-4 in FIG. 2.

FIG. 1 illustrates a bicycle 20 having a front wheel 22, a rear wheel 24, a frame 26 supported by the front and rear wheels, handlebars 28 for steering the bicycle, a seat 30 for supporting the rider, and a seat post assembly 32 supporting the seat above the frame. The illustrated seat post assembly 32 includes a lower seat support in the form of a lower tube 34 secured to the frame, an upper seat support in the form of an upper tube 36 secured to the seat and telescopically movable relative to the lower tube 34 along an axis A. Referring to FIG. 3, a pair of upper keys 38 secured to the upper tube slide within a pair of corresponding key ways (not shown) formed on an interior surface of the lower tube 34 in order to prevent rotation of the upper tube 36 relative to the lower tube 34.

Figure 5:
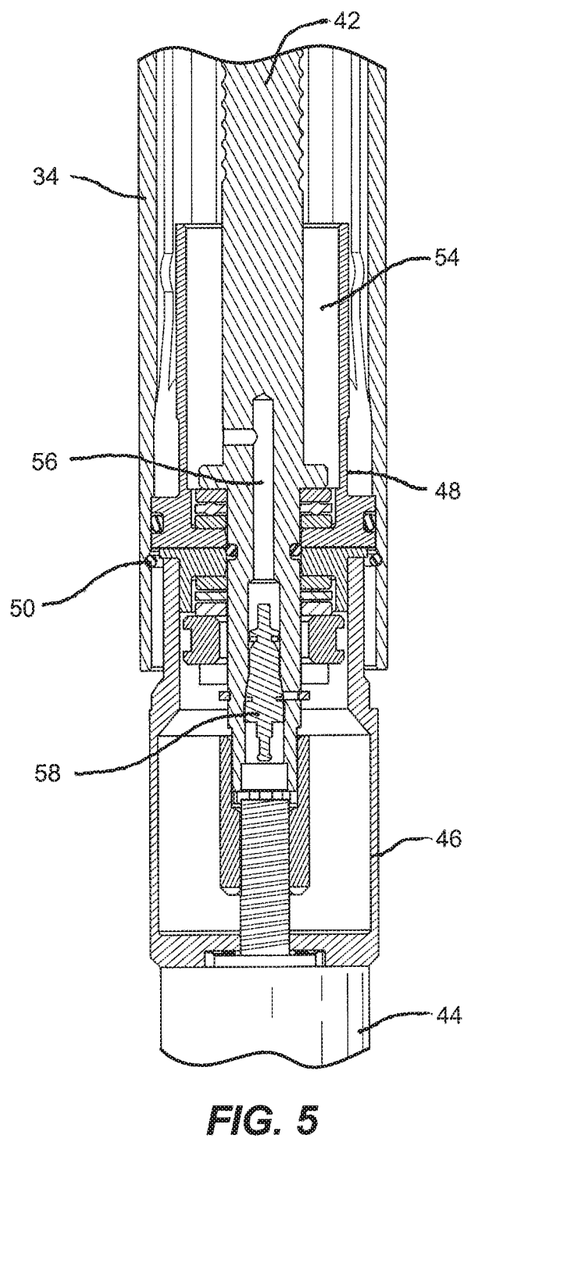
FIG. 5 is an enlarged view of the dashed circle labeled "FIG. 5" in FIG. 4.
Figure 6:
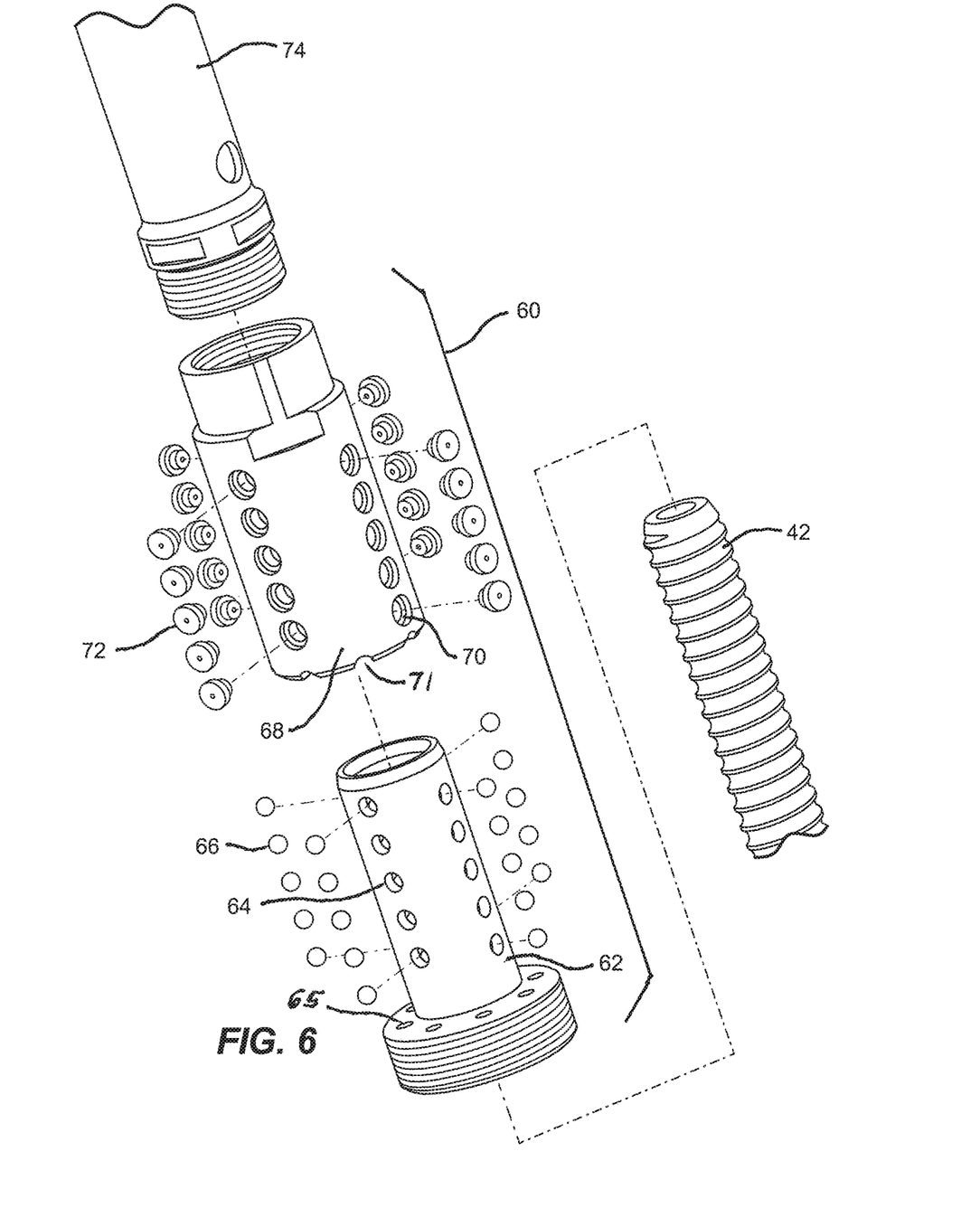
FIG. 6 is an enlarged exploded view of a coupling device in the form of a ball lock coupler.
Figure 7:
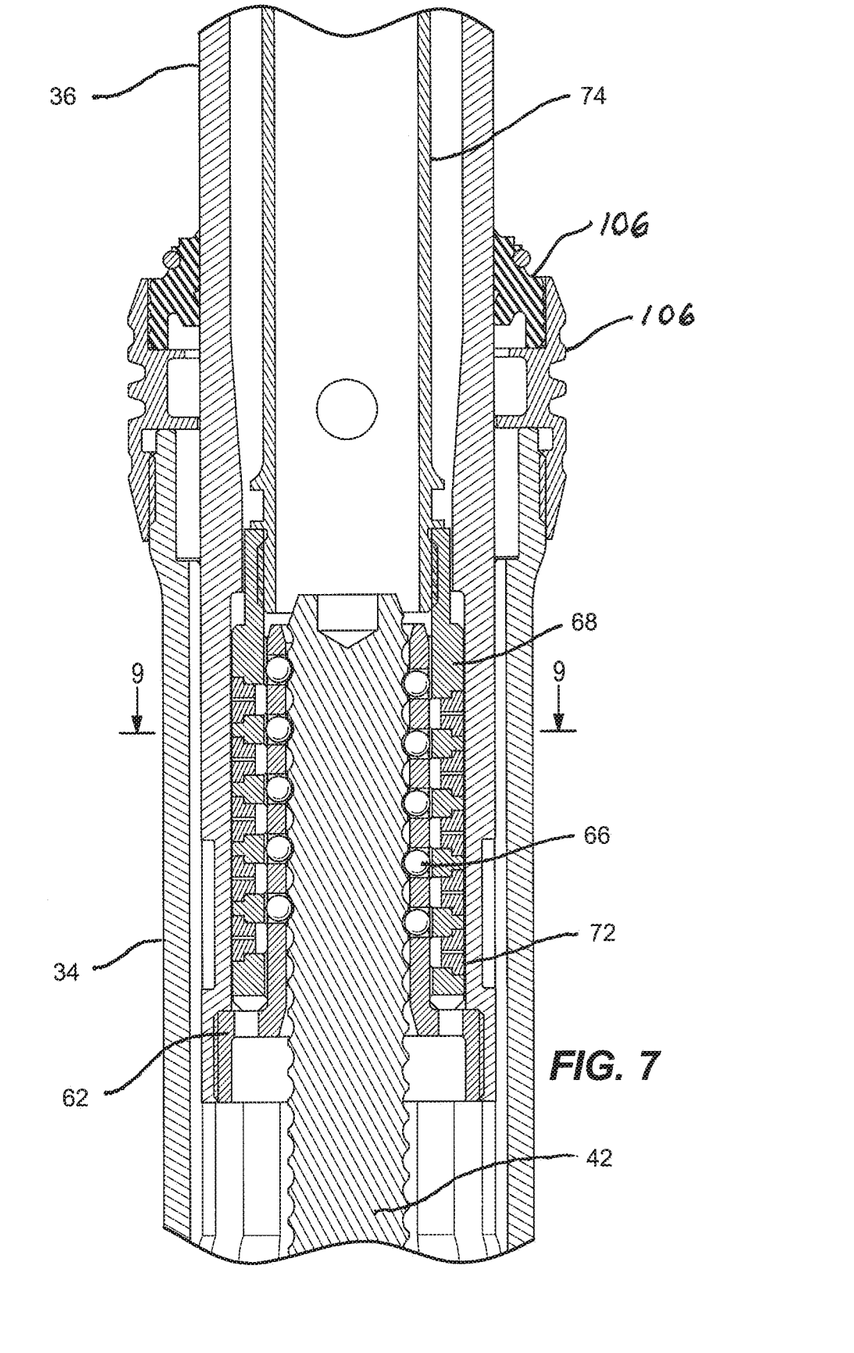
FIG. 7 is an enlarged view of the dashed circle labeled "FIG. 7" in FIG. 4 with the coupling device in a first or engaged position.

With reference to FIGS. 2-5, the seat post assembly 32 further includes an adjusting mechanism coupling the lower tube 34 to the upper tube 36 in order to facilitate adjustment of the position of the upper tube 36 relative to the lower tube 34. The adjusting mechanism includes a powered actuator 40 engageable with both the lower tube 34 and the upper tube 36 and configured to move the upper tube 36 relative to the lower tube 34. The powered actuator 40 includes a threaded rod 42 mounted for rotation inside the lower tube 34, an electric motor 44 for providing power to rotate the threaded rod 42, and a gear box 46 for transmitting power from the electric motor 44 to the threaded rod. The threaded rod 42 includes a helical groove and is supported by a thrust bearing 48 positioned near a lower end of the lower tube 34. The thrust bearing 48 supports the electric motor 44 and gear box 46, and is secured to the lower tube 34 with a snap ring 50 (FIG. 5). A pair of lower keys 52 prevents rotation of the thrust bearing 48 relative to the lower tube 34. In addition to opposing a thrust force on the threaded rod 42 in an axial direction, the thrust bearing 48 provides an airtight seat between the threaded rod 42 and the lower tube 34 to define a lower chamber 54 in the lower tube 34.

Referring specifically to FIG. 5, the lower end of the threaded rod 42 includes an air passage 56 that includes communication between the lower end of the threaded rod 42 and a mid-portion of the threaded rod 42 positioned in the lower chamber 54. An air valve 58 positioned in the air passage 56 allows the pressure in the lower chamber to be controlled.

The electric motor 44 and gear box 46 are designed to provide sufficient speed and torque to accomplish moving the upper tube 36 relative to the lower tube 34. In the illustrated embodiment, the electric motor 44 is a brushed direct current motor sold by Maxon as Model DCX26L EB KL 12V. One of ordinary skill will realize that a brushless direct current motor may be substituted without departing from the scope of the claims. The gear box 46 is an inline planetary gear box sold by Maxon as model GPX26 C 5.3:1. The motor is actuated using a remote switch (not shown) mounted to the handlebars. Such a switch can be wired or wireless and can be used to start/stop the motor. For example, the switch can be a two-position toggle switch, or it can be a push button that actuates the motor when pushed and stops the motor when released, or it can be a two-position push button switch that starts the motor with a single push and then stops the motor with a second push. Alternatively, it could be a three-position switch having a down position for moving the seat down, an up position for moving the seat up, and a neutral position in which the motor is not activated.

Figure 8:
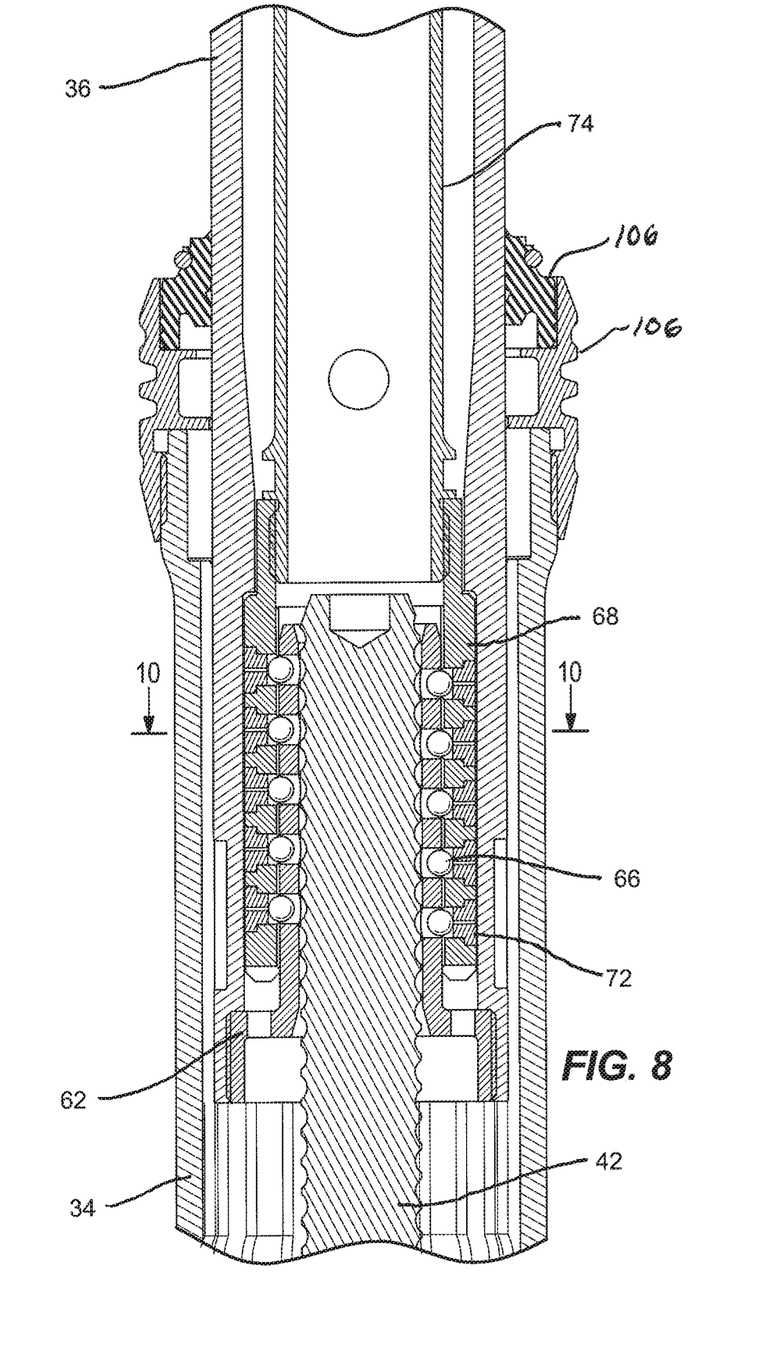
FIG. 8 is the enlarged view of FIG. 7 with the coupling device in a second or disengaged position.
Figure 9:
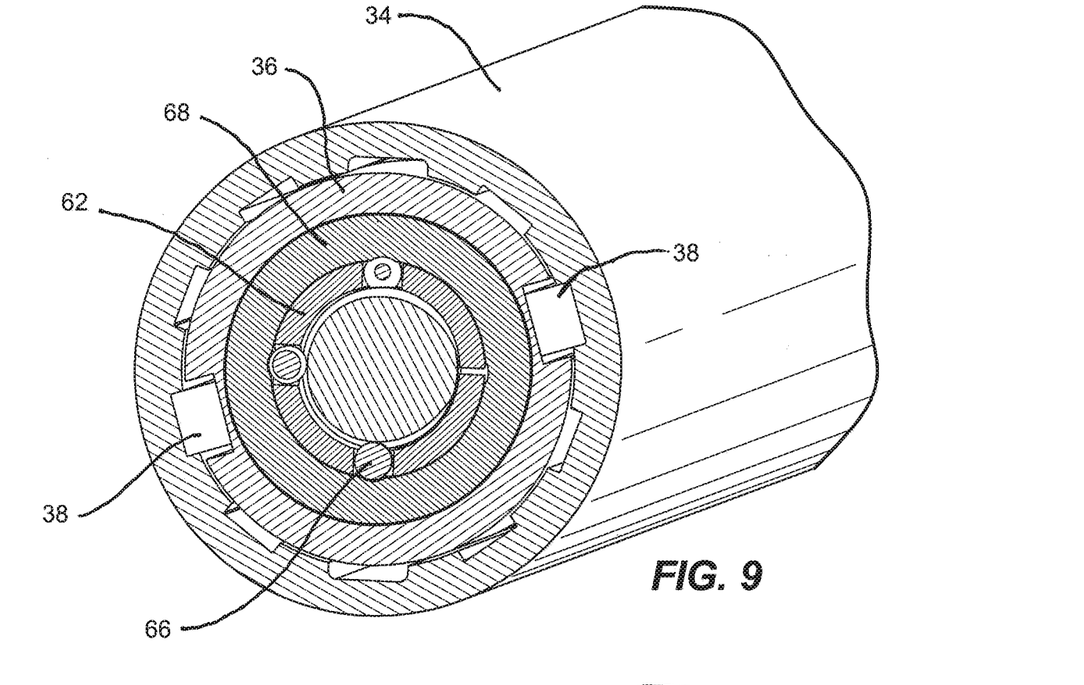
FIG. 9 is a section view taken along 9-9 in FIG. 7.
Figure 10:
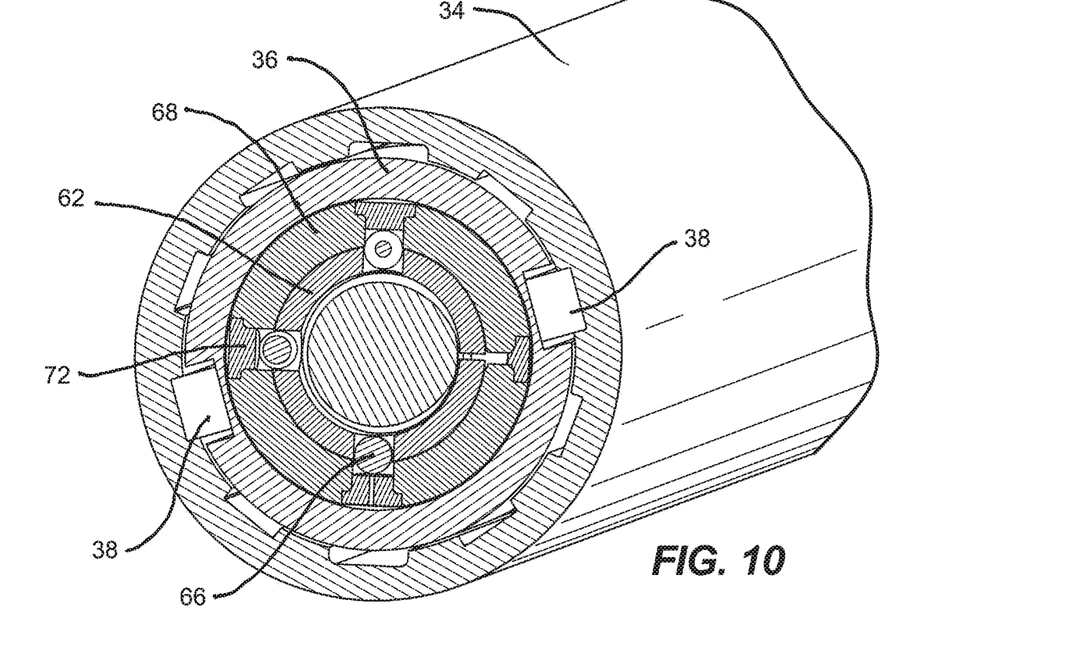
FIG. 10 is a section view taken along line 10-10 in FIG. 8.

The adjusting mechanism further includes a coupling device selectively connecting the powered actuator 40 to the upper tube 36. Referring to FIGS. 6-10, the illustrated coupling device is a ball lock coupler 60 that selectively connects the threaded rod 42 to the upper tube 36. The ball lock coupler 60 includes a socket body 62 threaded to a lower end of the upper tube 36 and having a plurality of inner openings 64 extending through a side wall and axial openings 65 through an end wall. The inner openings 64 are arranged in a helical pattern in order to follow the path of the helical groove in the threaded rod 42. The ball coupler 60 further includes a plurality of locking members 66 (e.g., steel balls) each positioned in a corresponding opening of the socket body 62, and a sleeve 68 positioned around the socket body 62. The sleeve 68 includes a plurality of outer openings 70 arranged in a helical pattern such that they can be aligned with corresponding inner openings 64 of the socket body 62. A plurality of end notches 71 are aligned with the axial openings 65 to allow the passage of air to and from the lower chamber 54. The sleeve 68 further includes a plurality of pins 72 press fit into the outer openings 70 to limit radially outward movement of the locking members 66. The sleeve 68 can be moved between a first position ("engaged" or "locked" position) where the outer openings 70 are not aligned with the inner openings 64 (FIGS. 7 and 9) and a second position ("disengaged" or "unlocked" position) where the outer openings 70 are aligned with the inner openings 64 (FIGS. 8 and 10). In the first position, the inner surface of the sleeve 68 forces the locking members 66 into engagement with the threaded rod 42, thereby locking the position of the coupling device relative to the threaded rod 42. In the second position, the outer openings 70 are aligned with the inner openings 64, thereby allowing the locking members 66 to move radially outward into the outer openings 70 and out of engagement with the threaded rod 42, thereby allowing axial movement of the coupling device relative to the threaded rod 42.

It should be appreciated that some embodiments of the present invention could use a coupling device other than a ball lock, such as a pin lock, a ring lock, or a cam lock.

In the illustrated embodiment, the second position of the sleeve 68 is axially displaced relative to the first position of the sleeve 68. This movement can be seen by comparing position of the sleeve 68 in FIG. 7 to the position of the sleeve 68 in FIG. 8. This movement of the sleeve 68 is accomplished using an actuator tube 74 secured to an upper end of the sleeve 68 and extending upwardly toward an upper end of the upper tube 36. An upper bushing 76 guides movement of the actuator tube 74, and a tube spring 78 (see FIGS. 3, 11, and 12) biases the actuator tube 74 downward such that the sleeve 68 is biased toward the first position.

Figure 11:
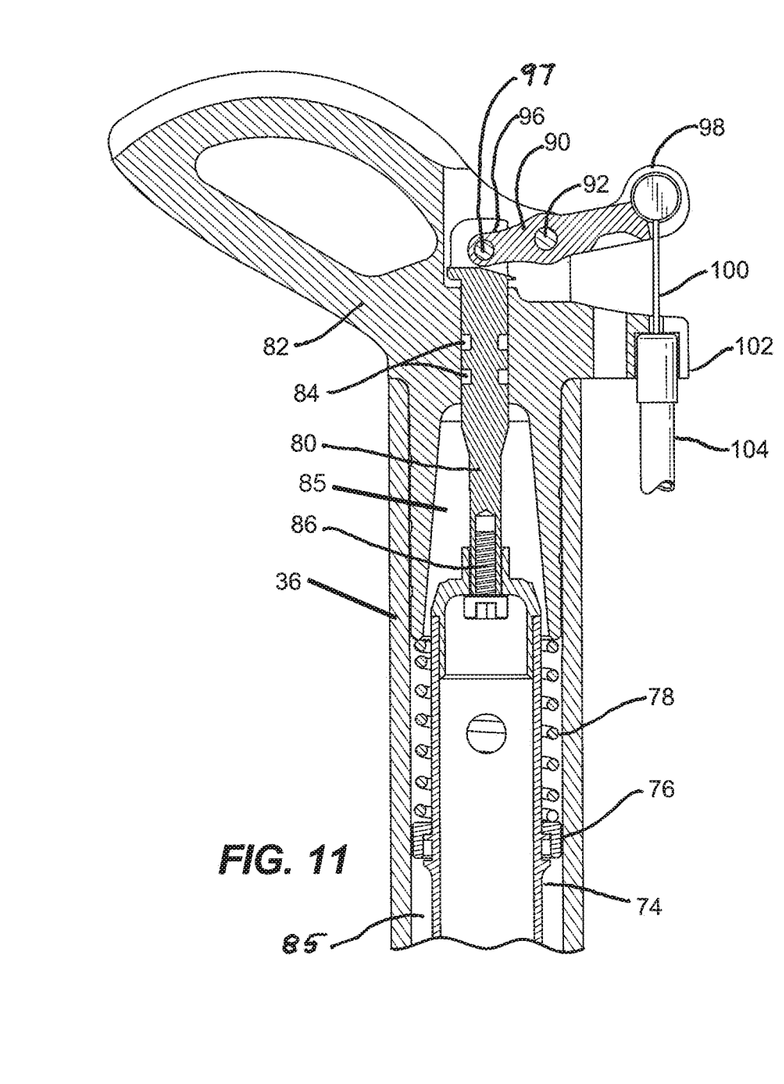
FIG. 11 is a section view of an actuator in a first position.
Figure 12:
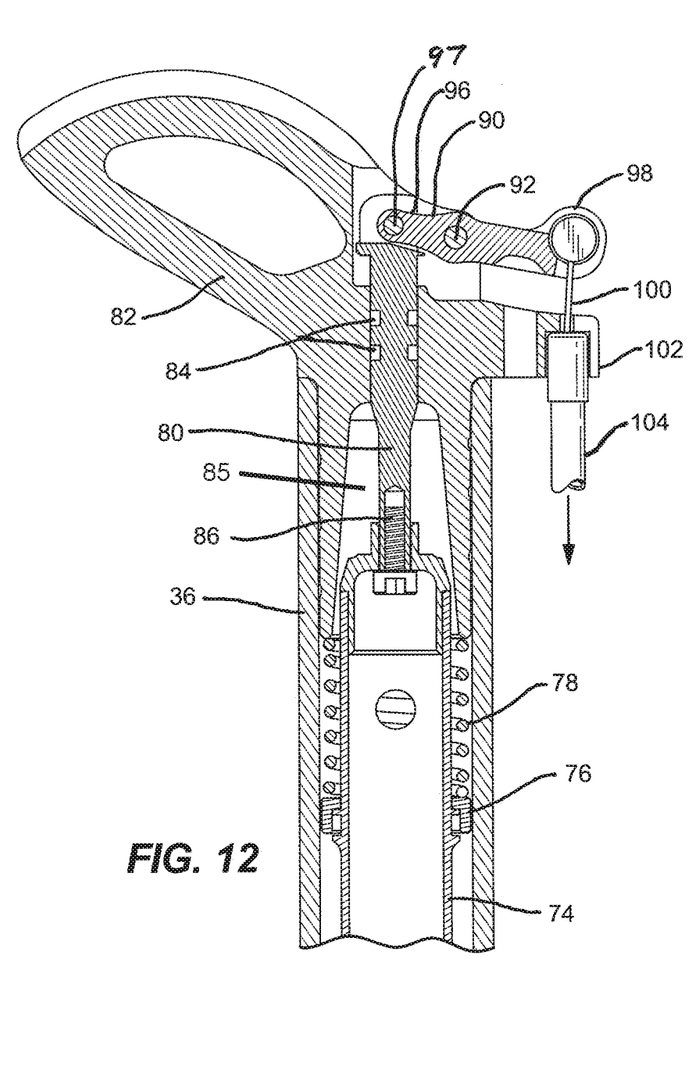
FIG. 12 is the section view of FIG. 11 with the actuator in a second position.
Figure 13:
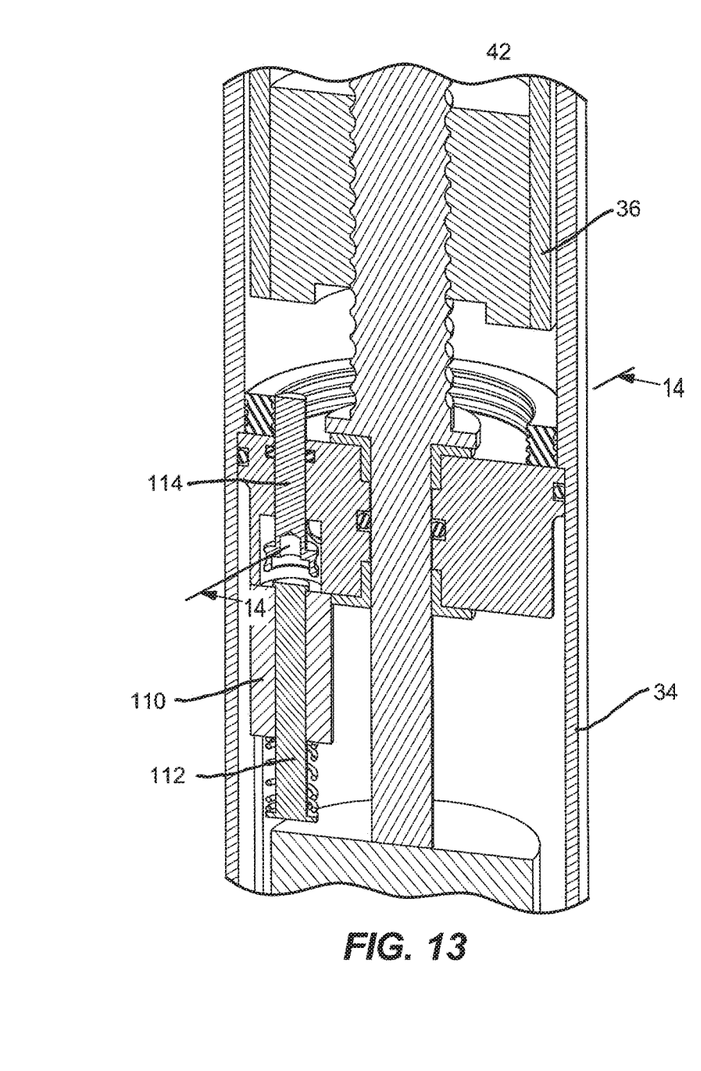
FIG. 13 is a section view of a limit switch usable with the present invention.
Figure 14:
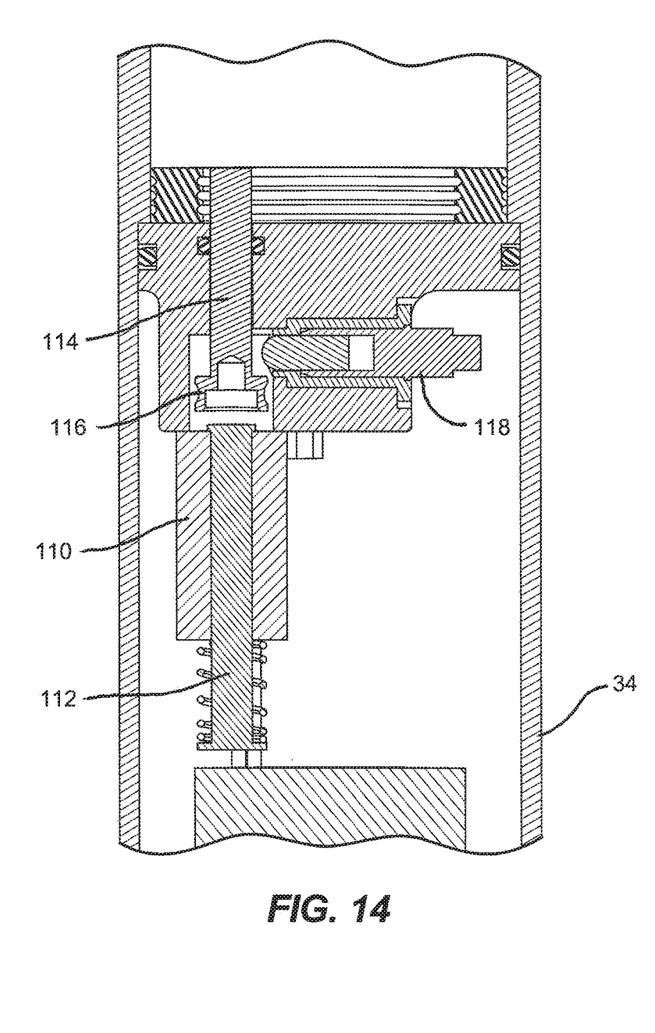
FIG. 14 is a section view of the limit switch taken along line 14-14 in FIG. 13.
Figure 15:
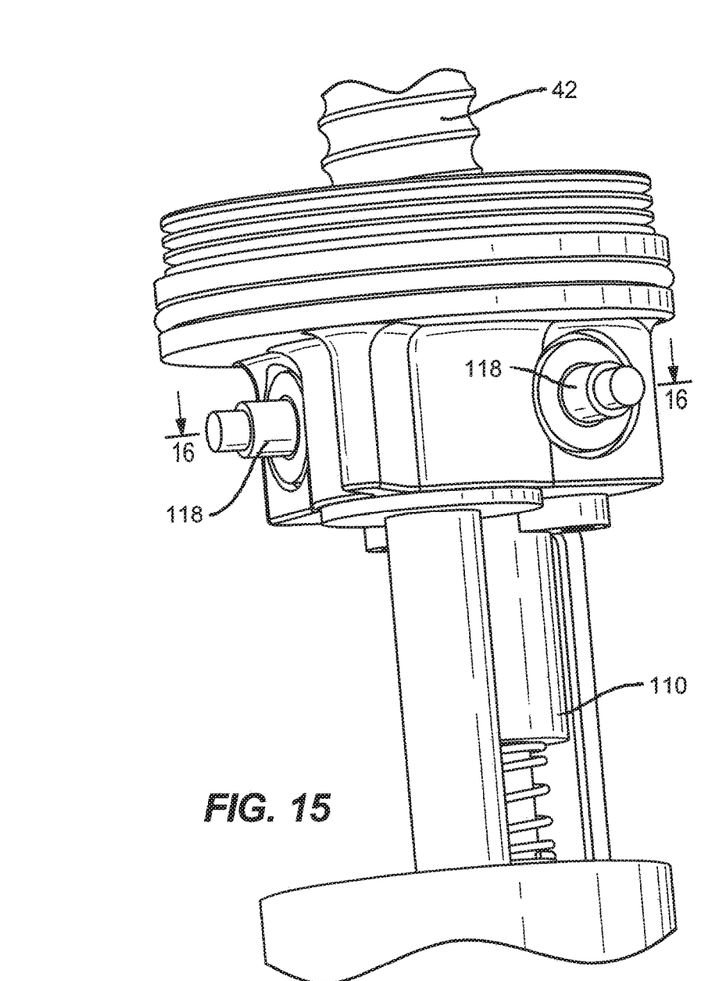
FIG. 15 is a perspective view of the limit switch.
Figure 16:
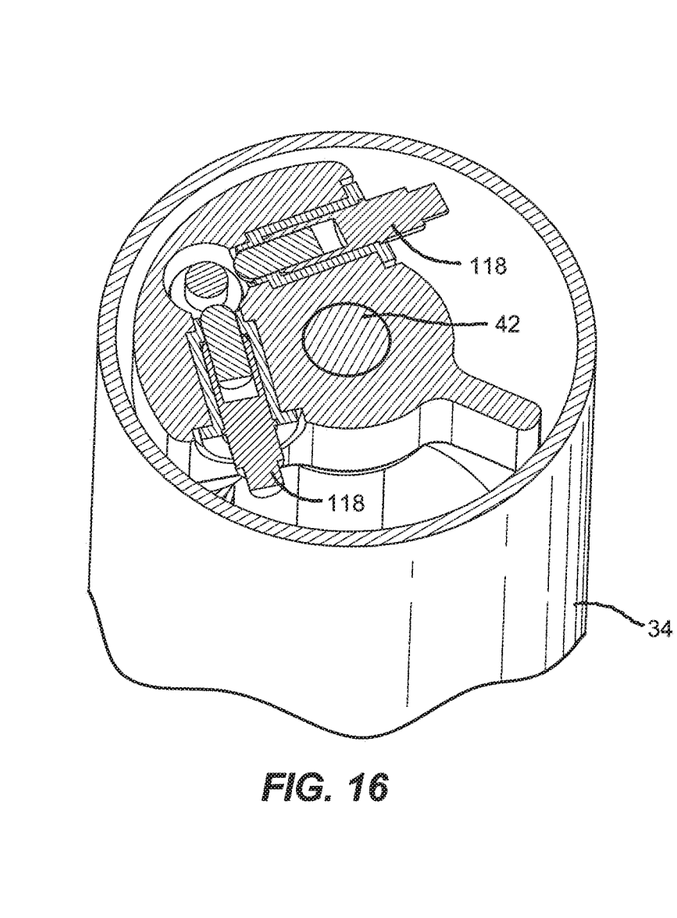
FIG. 16 is a section view of the limit switch taken along line 16-16 in FIG. 15.

Referring to FIGS. 11 and 12, an actuator plunger 80 is mounted for sliding movement in a top cap 82 secured to the upper end of the upper tube 36, and a pair of seals 84 prevent the escape of pressurized air from inside an upper chamber 85 in the upper tube 36. The lower end of the actuator plunger 80 slides within an upper end of the actuator tube 74, and the head of a fastener 86 connects the actuator plunger 80 to the actuator tube 74 to provide a lost motion connection. With this arrangement, upward movement of the actuator plunger 80 will result in upward movement of the actuator tube 74 and sleeve 68 from the first position to the second position. Downward movement of the actuator plunger 80 will allow the actuator tube 74 and sleeve 68 to move from the second position to the first position under the force of the tube spring 78.

An actuator pivot 90 is pivotally connected to the top cap 82 at a pivot shaft 92, and a pivot spring 94 (FIG. 3) biases the rotation of the actuator pivot 90 in a counter-clockwise direction as shown in FIGS. 11 and 12. A first end 96 of the actuator pivot 90 is pivotally connected to an upper end of the actuator plunger 80 by a pivot pin 97, and an opposite second end 98 of the actuator pivot 90 is adapted to be secured to a cable 100, as is known in the art.

The top cap 82 further includes a cable stop 102 that receives a cable housing 104 and facilitates the passage of the cable 100 from the second end of the actuator pivot 90 and through the cable stop 102 and cable housing 104. The cable housing 104 is designed to be routed to the handlebars of the bicycle, terminating in an actuator lever (not shown) that is operatively coupled to the end of the cable 100. By virtue of this arrangement, it can be seen that movement of the actuator lever at the handlebars will pull the cable 100 and result in pivoting of the actuator pivot 90, upward movement of the actuator plunger 80, and corresponding upward movement of the actuator tube 74 and sleeve 68 to move the sleeve 68 from the first position to the second position. Movement of the actuator lever in the opposite direction will result in a reverse movement of the cable, actuator pivot 90, actuator plunger 80, actuator tube 74, and sleeve 68 back to the first position.

The seat post assembly 32 further includes a spring that biases the upper tube 36 toward an extended position relative to the lower tube 34. In the illustrated embodiment, the spring is provided by pressurized air contained within the upper and lower chambers 85,54 defined by the upper and lower tubes 36,34. The chambers are maintained air tight by a series of seals 106 between the upper and lower tubes 36,34. The air can be pressurized by providing pressurized air through the air valve 58 in the lower end of the threaded rod 42, and air pressure can be released through that same air valve 58.

In operation, the height of the seat can be adjusted in two distinct ways. First the electric motor 44 can be actuated to cause rotation of the threaded rod 42. With the sleeve 68 in the first position, the locking members 66 are held in engagement with the threaded rod 42, and rotation of the threaded rod 42 will cause axial movement of the sleeve 68 relative to the threaded rod 42. The direction of movement of the sleeve 68 is dependent on the direction of rotation of the threaded rod 42. This movement of the ball lock coupler 60 will result in movement of the upper tube 36. The second way of adjusting the height of the seat is to press the lever on the handlebars, which causes movement of the sleeve 68 from the first position to the second position to disengage the ball lock coupler 60 from the threaded rod 42, as described above in more detail. With the rider not sitting on the seat, the disengagement of the ball lock coupler 60 from the threaded rod 42 will cause the seat to move upward to the fully raised position due to the air pressure in the chamber defined by the upper and lower tubes. The rider can then sit on the seat and adjust the downward position of the seat using the rider's weight. When the desired seat height is achieved, the handlebar lever can be released, thereby causing the sleeve 68 to move back to the first position and the ball lock coupler 60 to engage the threaded rod 42 and lock the axial position of the upper tube 36 relative to the lower tube 34.

In the illustrated embodiment, the electric motor 44 only turns in a single direction corresponding with downward movement of the seat. The electric motor 44 is actuated by pressing a button (not shown) on the handlebars, which actuates a solenoid 110 (see FIGS. 13-16), which causes upward movement of a solenoid plunger 112. As the solenoid plunger 112 moves upward, it contacts a limit switch 114 and moves the limit switch 114 upward until a groove 116 in the limit switch 114 engages two electrical contacts 118. The engagement of the limit switch 114 with the electrical contacts 118 completes an electrical circuit between a battery (not shown) and the electric motor 44 to thereby actuate the electric motor. The electrical contacts 118 are biased radially inward and engage the groove 116 to hold the limit switch 114 in position even after the handlebar button is released and the solenoid 110 returns to its starting position. Power to the electric motor 44 will continue until the upper tube 36 has travelled all the way to its lowest position, where it will contact the limit switch 114 and push it downward to disengage the groove 116 from the electrical contacts 118. This will result in an open circuit between the electrical contacts 118 to stop the electric motor 44. It should be appreciated that the above-described limit switch 114 and electrical contacts 118 could be replaced by any suitable switching mechanism, such as a torque limit switch, a current sensor, or a position sensor.

Various features and advantages of the invention are set forth in the following claims.

The invention claimed is:

1. A bicycle comprising:
 a front wheel and a rear wheel;
 a frame supported by the front wheel and the rear wheel;
 a seat; and
 a seat post assembly supported by the frame and supporting the seat, the seat post assembly including:
  a lower seat support secured to the frame;
  an upper seat support secured to the seat and movable relative to the lower seat support; and
  an adjusting mechanism coupling the lower seat support to the upper seat support, the adjusting mechanism including:

a powered actuator engageable with both the lower seat support and the upper seat support and configured to move the upper seat support relative to the lower seat support; and a coupling device selectively connecting the powered actuator to one of the lower seat support or the upper seat support, the coupling device including a locking member configured to move toward and away from the powered actuator to physically engage and disengage the powered actuator, the coupling device having a connected state wherein the locking member is physically engaged with the powered actuator and the powered actuator is operatively connected to the one of the lower seat support or the upper seat support and a disconnected state wherein the locking member is physically disengaged from the powered actuator and the powered actuator is operatively disconnected from the one of the lower seat support or the upper seat support.

2. A bicycle as claimed in claim 1, wherein the powered actuator comprises a threaded rod and wherein the coupling device comprises a ball lock coupler including:

a socket body having a plurality of openings through a sidewall, the plurality of openings being arranged in a substantially helical path; and wherein the locking member is one of a plurality of locking members each positioned in a corresponding opening of the plurality of openings of the socket body and movable relative to the socket body, wherein the plurality of locking members are positioned to engage the threaded rod.

3. A bicycle as claimed in claim 2, wherein the ball lock coupler further comprises a sleeve positioned around the socket body and movable relative to the socket body between a first position forcing the plurality of locking members to engage the threaded rod and a second position allowing the plurality of locking members to disengage the threaded rod.

4. A bicycle as claimed in claim 1, wherein the coupling device comprises a ball lock coupler comprising:

a socket body having an opening through a sidewall; and wherein the locking member is positioned in the opening and movable relative to the socket body.

5. A bicycle as claimed in claim 4, wherein the ball lock coupler further comprises a sleeve positioned around the socket body and movable relative to the socket body between a first position forcing the locking member to engage the powered actuator and a second position allowing the locking member to disengage the powered actuator.

6. A bicycle as claimed in claim 5, wherein the upper seat support is movable relative to the lower seat support along an axis, and wherein the first position of the sleeve is axially displaced relative to the second position in a path substantially parallel to the axis.

7. A bicycle as claimed in claim 1, wherein the seat post assembly further comprises a spring biasing the upper seat support toward an extended position relative to the lower seat support.

8. A bicycle as claimed in claim 7, wherein the upper seat support and the lower seat support are in telescoping engagement and define a chamber in between, and wherein the spring comprises air seals sealing the chamber and pressurized air in the chamber.

9. A bicycle seat post assembly comprising:

a lower seat support adapted to be secured to a bicycle frame;

an upper seat support adapted to be secured to a bicycle seat and movable relative to the lower seat support; and an adjusting mechanism coupling the lower seat support to the upper seat support, the adjusting mechanism including:

a powered actuator engageable with both the lower seat support and the upper seat support and configured to move the upper seat support relative to the lower seat support; and a coupling device selectively connecting the powered actuator to one of the lower seat support or the upper seat support, the coupling device including a locking member configured to move toward and away from the powered actuator to physically engage and disengage the powered actuator, the coupling device having a connected state wherein the locking member is physically engaged with the powered actuator and the powered actuator is operatively connected to the one of the lower seat support or the upper seat support and a disconnected state wherein the locking member is physically disengaged from the powered actuator and the powered actuator is operatively disconnected from the one of the lower seat support or the upper seat support.

10. A bicycle seat post assembly as claimed in claim 9, wherein the powered actuator comprises a threaded rod and wherein the coupling device comprises a ball lock coupler including:

a socket body having a plurality of openings through a sidewall, the plurality of openings being arranged in a substantially helical path; and wherein the locking member is one of a plurality of locking members each positioned in a corresponding opening of the plurality of openings of the socket body and movable relative to the socket body, wherein the plurality of locking members are positioned to engage the threaded rod.

11. A bicycle seat post assembly as claimed in claim 10, wherein the ball lock coupler further comprises a sleeve positioned around the socket body and movable relative to the socket body between a first position forcing the plurality of locking members to engage the threaded rod and a second position allowing the plurality of locking members to disengage the threaded rod.

12. A bicycle seat post assembly as claimed in claim 9, wherein the coupling device comprises a ball lock coupler comprising:

a socket body having an opening through a sidewall;

wherein the locking member is positioned in the opening and movable relative to the socket body; and a sleeve positioned around the socket body and movable relative to the socket body between a first position forcing the locking member to engage the powered actuator and a second position allowing the locking member to disengage the powered actuator.

13. A bicycle seat post assembly as claimed in claim 12, wherein the upper seat support is movable relative to the lower seat support along an axis, and wherein the first position of the sleeve is axially displaced relative to the second position in a path substantially parallel to the axis.

14. A bicycle seat post assembly as claimed in claim 9, further comprising a spring biasing the upper seat support toward an extended position relative to the lower seat support.

15. A bicycle seat post assembly as claimed in claim 14, wherein the upper seat support and the lower seat support are in telescoping engagement and define a chamber in between, and wherein the spring comprises air seals sealing the chamber and pressurized air in the chamber.

\* \* \* \* \*